United States Patent [19]

Jacobson et al.

[11] Patent Number: 4,847,596
[45] Date of Patent: Jul. 11, 1989

[54] WALLPAPER COMPRISING AN OPTICAL FIBRE

[75] Inventors: Amnon Jacobson, Tel Aviv; Eli Goloub; Jacob Sharony, both of Ramat-Gan, all of Israel

[73] Assignee: Ispra Israel Product Research Company Ltd., Israel

[21] Appl. No.: 94,321

[22] Filed: Sep. 4, 1987

[30] Foreign Application Priority Data

Oct. 10, 1986 [IL] Israel ............................................. 80276

[51] Int. Cl.⁴ ............................................. G08B 13/12
[52] U.S. Cl. ................................... 340/550; 250/227; 350/96.1; 428/904.4
[58] Field of Search ............... 340/550; 428/904.4; 350/96.1, 96.29; 250/227; 156/179, 176, 280

[56] References Cited

U.S. PATENT DOCUMENTS

| | | | |
|---|---|---|---|
| 3,594,770 | 7/1971 | Ham et al. | 340/550 |
| 3,888,711 | 6/1975 | Breitner | 156/179 |
| 4,234,875 | 11/1980 | Williams | 340/550 |
| 4,650,704 | 3/1987 | Rothenberg | 428/904.4 |

Primary Examiner—Glen R. Swann, III
Attorney, Agent, or Firm—Steinberg & Raskin

[57] ABSTRACT

The present invention relates to a wallpaper which comprises an optical fibre which together with an outside control and/or alarm unit forms a closed optical circuit. The wallpaper is a sheet made from a suitable material, e.g. paper, plastic material and textile fabrics. This material may have the adhesive layer on itself. Alternatively, the adhesive is applied before lamination. The invention relates also to a process for the manufacture of the wallpaper.

12 Claims, 3 Drawing Sheets

WALLPAPER COMPRISING AN OPTICAL FIBRE

BACKGROUND OF THE INVENTION

The present invention relates to wallpaper comprising an optical fibre.

Wallpaper sheets are known. They are used in particular for covering transparent windows (being usually transparent by themselves or sometimes opaque), walls, doors, etc. on flats, offices and the like. Wallpaper in connection with the present invention means sheets made from any suitable material for the present purpose, i.e. certain kinds of paper, plastic materials, textile fabrics, having the adhesive layer on themselves laminated directly on the wall, window or having the adhesive applied just before lamination.

In many cases it is desirable to provide the wallpaper with means to detect an intrusion easily and in real time in order to be able to actuate an alarm immediately. Such means should advantageously be disguised so that a burglar will not be aware of them.

SUMMARY OF THE INVENTION

It has now been found that a wallpaper being provided with an optical fibre achieves the above object.

The present invention thus consists of a wall paper (as herein defined) comprising an optical fibre, which fibre together with an outside control and/or alarm unit forms a closed optical circuit.

The form of said closed circuit may be any suitable one, e.g. a loop, a spiral, a zig-zag, etc. In a zig-zag system, if used, one fibre section is advantageously distanced at least 6 cm from the adjacent one.

Any commercially available optical fibre and wallpaper, including the transparent type, may be used for the present invention.

The ends of the optical fibre extending outside the wallpaper may be connected to any suitable emitter and detector. The emitter and detector may be installed in the tubes or fibers located between two sheets of wallpaper.

The size of the wallpaper according to the present invention is not a critical feature thereof. This size is determined by the requirements of the customer, the size of the manufacturing machine, etc.

The present invention consists also in a process for the manufacture of the wallpaper according to the present invention which comprises:
- a. covering a wallpaper sheet with a suitable laminating agent; and
- b. putting an optical fibre in a pre-determined form on the laminated wallpaper sheet.

In a preferred embodiment of the present invention the wallpaper prepared as above is
- c. covered with a further layer of a wallpaper sheet; with
- d. the final wallpaper being subjected to a compression through a roller mill or other procedures knwon per se; and
- e. one side of the sandwiched paper being covered with an adhesive.

Advantageously, if step c has been performed, small plastic or teflon round or flat tubes are inserted into the ends of the optical fibre between the wallpaper sheets.

Any other kind of fibre protection may be used if required.

Several sheets of wallpaper may be used, the optical fibre being inserted between two of them.

The wallpaper according to the present invention may also be manufactured in a process in which the optical fibre is put in a pre-determined form into the wallpaper whether it is manufactured as one layer or as multilayers.

Any commercially available laminating agent may be used.

The small tubes, if any, are made from a material which resists temperatures of $-50°$ C. to $150°$ C., e.g. teflon or certain other plastic materials such as nylon.

The diameter of the optical fibre with coating is e.g. 0.25 mm. The inside diameter of the tubes, if any, should be such that it enables free movement of the optical fibre within it in the wallpaper after compression, e.g. about 0.5 mm. The length of each tube is advantageously about 1.5-2 cm within the wallpaper sheets.

BRIEF DESCRIPTION OF THE DRAWINGS

The present invention will now be illustrated with reference to the accompanying drawings without being limited by same. In said drawings.

DESCRIPTION OF THE PREFERRED EMBODIMENT

The wall-paper shown in FIGS. 1,2 and 4 to 6 comprises wall-paper sheets 1 and 2, laminated layers 3 and 4, teflon tubes 5 and 6 and optical fibre 7. This optical fibre 7 has a sinuous form. The distance between adjacent fibres is about 8 cm. The optical fibre utilized has a diameter of 0.25 mm with coating.

Figure 1:
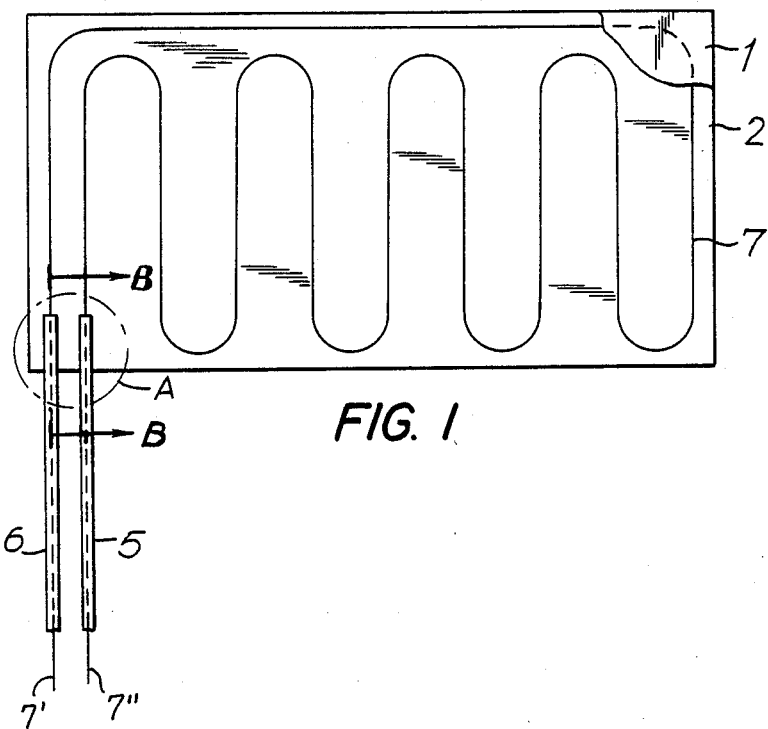
FIG. 1 shows a longitudinal view of a wallpaper according to the present invention.
Figure 5:
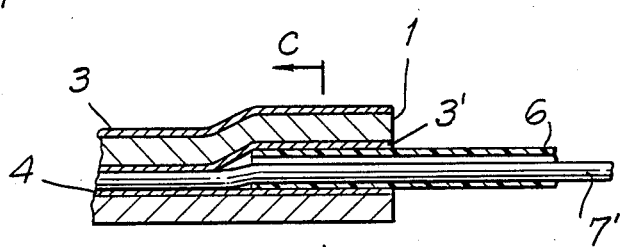
FIG. 5 shows a cross-section along line B—B of FIG. 1.
Figure 6:
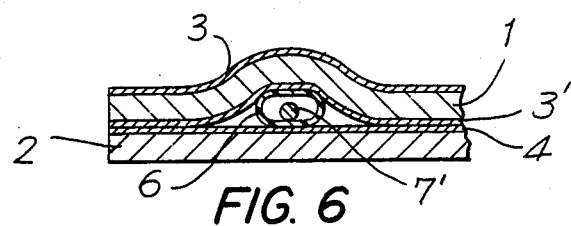
FIG. 6 shows a cross-section along line C—C of FIG. 5.
Figure 2:
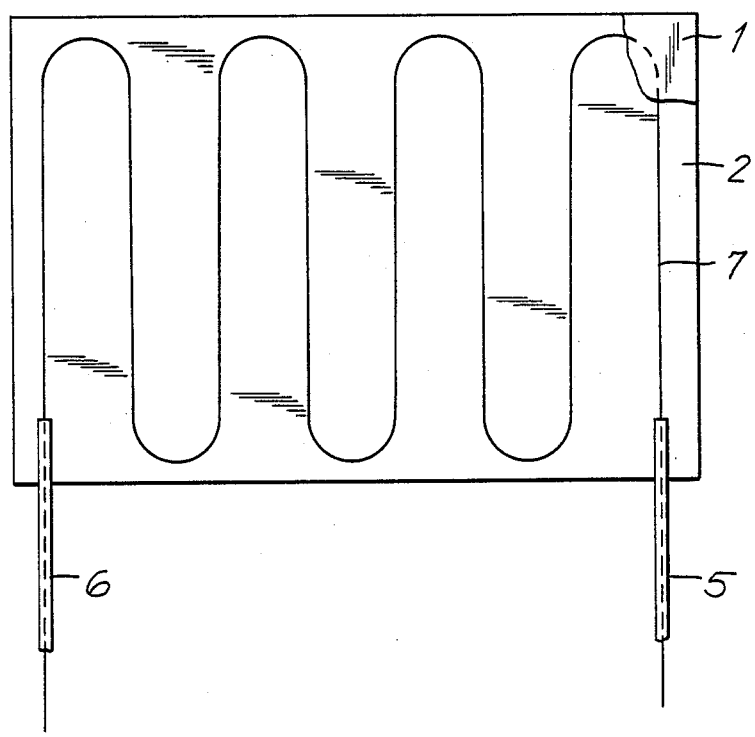
FIG. 2 shows a longitudinal view of another embodiment of a wallpaper according to the present invention.
Figure 3:
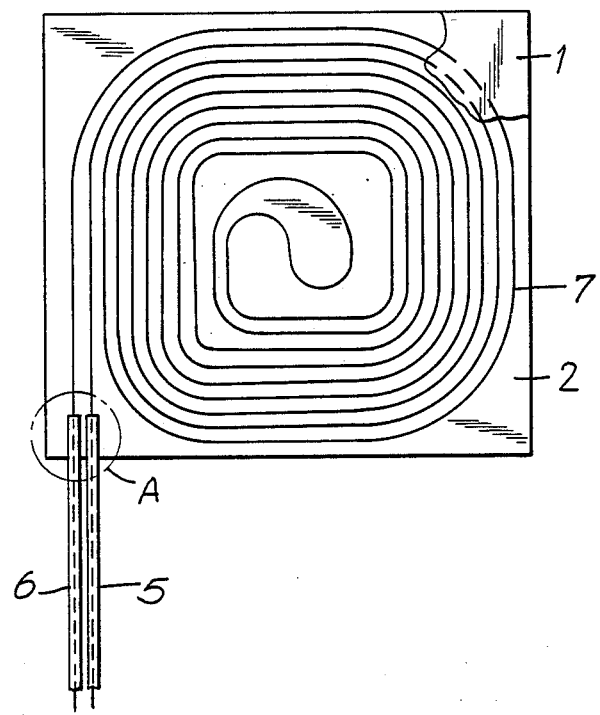
FIG. 3 shows a longitudinal view of a further embodiment of a wallpaper according to the present invention.
Figure 4:
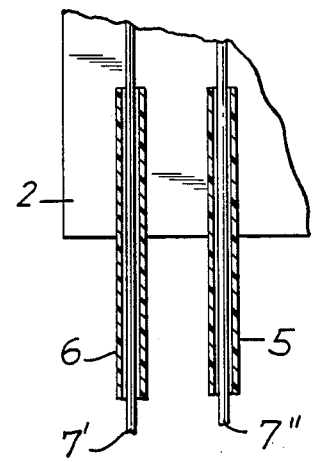
FIG. 4 shows increased detail A of FIGS. 1 and 3.

The wall-paper shown in FIG. 3 differs from that shown in FIGS. 1 and 2 in that optical fibre 7 has a spiral form.

It is readily understood that ends 7' and 7" are connected to an emitter and detector unit, respectively. Together with optical fibre 7 they form a closed circuit.

We claim:

1. A process for manufacture of wallpaper comprising an optical fibre, comprising the steps of:
   (a) covering a wallpaper sheet with a suitable laminating agent;
   (b) placing an optical fibre in a pre-determined form on said laminated wallpaper sheet;
   (c) covering the wallpaper with a further layer of a wallpaper sheet to sandwich the optical fibre between the sheets;
   subjecting the final wallpaper to compression; and
   covering one side of the wallpaper with the optical fiber sandwiched therein, with an adhesive;
   wherein, after step (c) has been performed, small round or flat, plastic or teflon tubes, are inserted over the ends of the optical fibre between the wallpaper sheets.

2. Wallpaper comprising at least one optical fibre adapted to be connected to an outside control or alarm unit and form a closed optical circuit therewith;

a wallpaper sheet;

a laminating layer disposed upon said wallpaper sheet;

said optical fibre disposed upon said laminating layer;

an additional wallpaper sheet disposed upon said laminating layer, with said optical fibre being sandwiched between said two wallpaper sheets; and tubes inserted over ends of said optical fibre.

3. The combination of claim 2, wherein said tubes are round or flat and are formed of plastic or teflon.

4. The combination of claim 2, wherein said tubes are made from material which resist temperature of $-50°$ C. to $150°$ C.

5. The combination of claim 2, wherein each run of said optical fibre is spaced at least 5 cm. from an adjacent run of said optical fibre.

6. The combination of claim 5, wherein distance between adjacent runs of said optical fibre is about 8 cm.

7. The combination of claim 2, wherein
said optical fibre with coating has a diameter of 0.25 mm.

8. The combination of claim 2, wherein length of each said tube is about 1.5–2 cm.

9. The combination of claim 2, wherein
said composite wallpaper is subjected to compression,
with inner diameter of each said tube allowing free movement of said optical fibre within the same, after said compression.

10. The combination of claim 9, wherein
the inner diameter of each said tube after said compression is about 0.5 mm.

11. The combination of claim 2, wherein said optical fibre forms a wavy or zig-zag path in said wallpaper.

12. The combination of claim 2, wherein said optical fibre forms a spiral path in said wallpaper.

* * * * *